United States Patent Office 3,592,931
Patented July 13, 1971

3,592,931
PREPARATIONS FOR COMBATING HARMFUL MICROORGANISMS
Max Duennenberger, Frenkendorf, and Max Schellenbaum, Muttenz, Switzerland, assignors to Ciba Limited, Basel, Switzerland
No Drawing. Filed May 28, 1968, Ser. No. 732,527
Claims priority, application Switzerland, June 16, 1967, 8,580/67
Int. Cl. A01n 9/24
U.S. Cl. 424—311           6 Claims

ABSTRACT OF THE DISCLOSURE

Preparations for combating harmful microorganisms containing as active ingredient 2,4′-dihydroxy-3′,5′-di-tertiary butyl-diphenylketones-(1,1′) carrying a substituent in the 4-position.

---

The present invention provides preparations for combating harmful microorganisms, containing as active ingredient a diphenylketone of the formula (I)
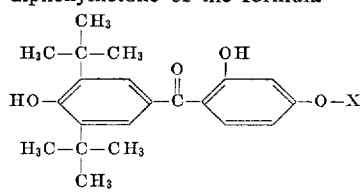

in which X represents a hydrogen atom, an alkyl, hydroxylalkyl, halogenoalkyl, alkenyl or phenylalkyl radical or a group —$(C_nH_{2n}—O)_m$—$C_nH_{2n}$—Y or —OC—R (where Y stands for a hydroxyl group or a halogen atom, $m$ is an integer, at least 1, $n=2$ or 3, and R represents an alkyl, alkenyl, hydroxyalkyl, halogenoalkyl, phenyl or phenylalkyl residue). Preferred diphenylketones correspond to the formula (Ia)
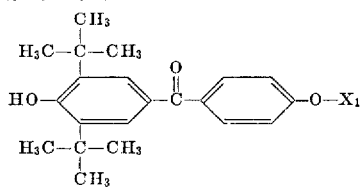

in which $X_1$ represents a hydrogen atom, an —OC—alkyl group whose alkyl residue contains 1 to 3, preferably 1, carbon atom, a chloroacetyl, n-butyl, 3-chloropropyl, alkyl or benzyl group.

Especially valuable active ingredients are the diphenylketones of the formula (2)
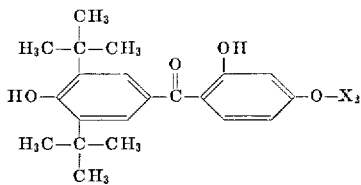

in which $X_2$ represents a hydrogen atom, a residue of the formula —OC—$CH_2$—Cl, or an —OC-alkyl whose alkyl residue contains 1 to 3 carbon atoms, for example 2,4,4′-trihydroxy-3′,5′-di-tertiary butyl-diphenylketone-(1,1′) of the formula (3)
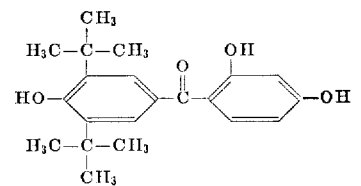

and 2,4′-dihydroxy - 4 - chloroacetoxy-3′,5′-di-tertiary butyl-diphenylketone-(1,1′) of the formula (4)
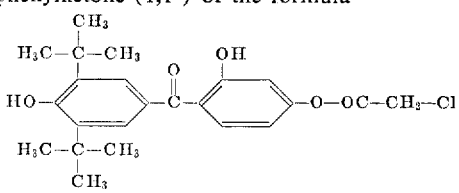

The diphenylketones of the Formula 1 are accessible by known methods. The ketone of the Formula 3 is obtained by reacting 3,5-di-tertiary butyl-4-hydroxybenzene-1-carboxylic acid chloride with 1,3-dihydroxybenzene in an anhydrous inert solvent in presence of a Friedel-Crafts catalyst, perferably aluminum chloride. From this basic substance the derivatives substituted on the para-position hydroxyl group can be manufactured.

Thus, the new diphenylketones of the formula

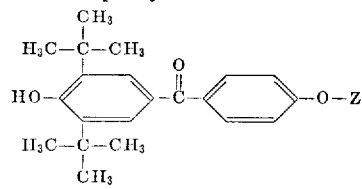

—where Z represents a hydroxyalkyl, halogenoalkyl, alkenyl, phenylaklyl group, a group —$(C_nH_{2n}—O)_m$—$C_nH_{2n}$—Y or —OC—R (in which Y represents a hydroxyl group or a halogen atom, $m$ is an integer, at least 1, $n=2$ or 3 and R represents an alkyl, alkenyl, hydroxyalkyl, halogenoalkyl, phenyl or phenylalkyl group)—are obtained when a 4-position hydroxyl group of the compound of the Formula 3 is etherified with a hydroxyalkyl halide, α-bromo-ω-chloroalkane, alkenyl halide, phenylalkyl halide, a halide of a polyethyleneglycol or polypropyleneglycol, or is esterified with a halide of a carboxylic acid of the formula HOOC—R (where R has the above meaning) or ethylene oxide or propylene oxide is added on to it.

When the diphenylketone of the Formula 1 or 5 contains in the residue X or Z respectively benzene nuclei, the latter may contain further substituents, for example alkyls such as methyl or ethyl groups, alkoxy such as methoxy or ethoxy groups, or halogen such as chlorine atoms.

The preparations for combating harmful microorganisms, which contain diphenylketones of the Formula 1, may be applied in the usual manner. A specially valuable feature of the new preparations is their broad antibacterial activity spectrum which in the case of many compounds includes both gram - positive and gram - negative bacteria. The diphenylketones are odourless and this is especially valuable insofar as their application is concerned. Accordingly, the present invention includes also their use in pest control quite generally. Their use is possible on a very broad basis, especially for protecting organic substrates from infestation by destructive and pathogenic (including phytopathogenic) microorganisms. The diphenylketones may thus be used as preservatives or disinfectants for textile materials and industrial products of all kinds, in plant protection, in agriculture, in veterinary medicine and in cosmetics.

As examples of industrial products that can be preserved with the aid of the diphenylketones the following may be mentioned:

Textile assistants or improving agents, glues, binders, paints, dye and printing pastes and similar preparations based on organic or inorganic dyestuffs or pigments, including those which contain a share of casein or other organic compounds. Also wall and ceiling paints, for example those which contain an albumin dyestuff binder, can be protected from infestation by pests by the addition of the new compounds. They may also be used in timber protection.

Furthermore, the diphenylketones of the Formula 1 may be used for a preservative and disinfectant finish on fibres and textile materials; they may be applied to natural and synthetic fibres alike and produce on them a prolonged activity against harmful (including pathogenic) organisms, for example fungi and bacteria. The diphenylketones may be added before, during or after a treatment of these textile materials with other substances, inter alia, for example dye or printing pastes or dressings.

Textile materials treated in this manner are also protected against the appearance of body odour caused by microorganisms.

The diphenylketones of the Formula 1 may also be used as preservatives in the cellulose and paper industries, inter alia for preventing the known formation of slime, due to microorganisms, in paper-making machines.

Furthermore, when diphenylketones of the Formula 1 are combined with wash- or surface-active substances there are obtained washing and cleaning agents having an excellent antibacterial and/or antimycotic activity. The diphenylketone may be incorporated, for example, with soaps, with soap-free wash- or surface-active substances or with mixture of soaps and soap-free wash-active substances; in these combinations it retains its full antimicrobial efficiency.

Aqueous preparations of these antimicrobial soaps may be used for providing textile materials with an antimicrobial finish, for example in washing, since the active substance of the Formula 1 is capable of depositing substantively on the textile material.

Cleaning agents containing a diphenylketone of the Formula 1 may be used in industry and in the home, also in the food industry, for example in dairies, breweries or abattoirs.

The activity may also be utilized in preserving and disinfectant finishes on synthetics. When a plasticizer is used, it is advantageous to dissolve or disperse the diphenylketone in the plasticizer and to add this solution or dispersion to the synthetic. It is advantageous to ensure that the diphenylketone is as evenly as possible distributed in the synthetic material. Synthetics having antimicrobial properties may be used for all kinds of utilitarian articles which are desired to have a defensive activity against various germs, for example bacteria and fungi, for example in doormats, bathroom curtains, seats, treads in swimming-baths or wall coverings. When the diphenylketones are incorporated with wax and polishing compositions, floor and furniture polishes having a disinfectant effect are obtained.

The diphenylketones of the Formula 1 may be applied to the textile material to be protected in various ways, for example by impregnation or spraying with solutions or suspensions that contain the said compounds as active ingredient. Depending on the purpose in hand the content of active substance may range from 1 to 30 g. of active substance per litre of treatment liquor. In most cases textile materials of a synthetic or natural kind are sufficiently protected from infestation by fungi and bacteria when the treatment liquor contains 0.1 to 3% of active substance. The active substance may also be applied in combination with other textile assistants such as finishes, anticrease dressings or the like.

The forms of application may correspond to the usual formulations of pesticidal preparations; for example, a preparation containing a diphenylketone of the Formula 1 may, if desired, further contain additives such as vehicles, solvents, diluents, dispersants, wetting agents or adhesives or the like, as well as other pesticides. Finally, these preparations for combating harmful microorganisms may contain two or more compounds of the Formula 1 side by side.

Parts and percentages in the following Manufacturing Instructions and in the examples are by weight, unless otherwise indicated.

MANUFACTURING INSTRUCTIONS

The formulae and melting points of the compounds A to $F_2$ are listed in Table I.

(A) 25 parts of 3,5-di-tertiary butyl-4-hydroxybenzenecarboxylic acid in 100 parts of thionylchloride are refluxed and stirred for 1 hour. The excess thionylchloride is then distilled off under vacuum and the acid chloride (melting at 94° C.) is dissolved in 120 parts of nitrobenzene. 11 parts of resorcinol and 14 parts of anhydrous aluminium chloride are added at 10 to 15° C. and the mixture is stirred for 20 hours at 40° C. The dark reaction solution is poured into 500 parts of ice water, washed neutral and the reaction mixture is subjected to steam distillation and dried, to yield about 30 parts of the compound of the Formula 3. After two recrystallization from methylenechloride+hexane the faintly yellowish compound (A) of the Formula 3 is obtained.

(B) 6.9 parts of the compound of Formula 3 are dissolved in 70 parts of toluene. While stirring at 40° C., first 1.6 parts of pyridine and then 2.3 parts of chloroacetylchloride are added; the whole is stirred for 2 hours at 60 to 70° C. and the reaction mixture is subjected to steam distillation, whereby the reaction product is obtained in substantially colourless crystals in a yield of about 7.2 parts. After two recrystallizations from methylenechloride+methanol the compound (B) of the Formula 4 is obtained.

(C) 6.9 parts of the compound of Formula 3 are dissolved in 40 parts of dimethylsulphoxide and 0.8 part of sodium hydroxide and then 2.8 parts of n-butylbromide are dropped in within 1 hour at 30° C., and the batch is stirred on for 5 hours at 40 to 45° C. and then cooled to 20° C. The reaction mixture is mixed with 30 parts of water, whereupon the reaction product settles out in form of substantially colourless crystals in a yield of about 7.5 parts. After three recrystallizations from aqueous methanol the compound (C) is obtained.

(D) When in the manufacturing process under (C) above n-butylbromide is replaced by an equivalent quantity of 1-chloro-3-bromopropane, the compound (D) is obtained in a similar purity and yield.

(E) When in the manufacturing process described under (B) the chloroacetylchloride is replaced by an equivalent quantity of acetylchloride, compound (E) is obtained in a similar purity and yield.

(F) When in the manufacturing process described under (C) n-butylbromide is replaced by an equivalent quantity of benzylbromide or allylbromide, compounds $F_1$ and $F_2$ are obtained in a similar purity and yield.

TABLE I

| Compound | Formula Number | X in formula (1) | Melting point, ° C. |
|---|---|---|---|
| A | 3 | —H | 194–195 |
| B | 4 | —OC—CH$_2$—Cl | 183–184 |
| C | | —CH$_2$—CH$_2$—CH$_2$—CH$_3$ | 135–136 |
| D | | —CH$_2$—CH$_2$—CH$_2$—Cl | 151–152 |
| E | | —OC—CH$_3$ | 180–182 |
| F$_1$ | | —CH$_2$— | 127–128 |
| F$_2$ | | —CH$_2$—CH=CH$_2$ | 117–118 |

Example 1.—Determining the minimal inhibitory concentration (MIC) towards bacteria and fungi The MIC (minimal inhibitory concentration) is determined by a method adapted from standard specifications which affords an approximation to absolute minimal inhibitory values of an active substance.

The test organisms used are *Staphylococcus aureus, Rhodotorula rubra, Trichophyton interdigitale* and *Trichophyton mentagrophytes.*

The minimal inhibitory concentration towards *Staphylococcus aureus* is determined by a dilution test and against the three fungi by a gradient plate test.

For the compound of Formula 3 the following values are obtained:

| | Minimal inhibitory concentration in parts per million |
|---|---|
| *Staphylococcus aureus* | 1 |
| *Rhodotorlua rubra* | 1 |
| *Trichophyton interdigitale* | 1.5 |
| *Trichophyton mentagrophytes* | 2 |

Similar activities are observed in the compound of the Formula 4.

Example 2

Specimens of 100 g. each of cotton creton are impregnated at 20° C. in a padder with a solution of 0.1% strength of the compound of Formula 3 in isopropanol and then squeezed to a weight increase of 100%.

The fabric specimens dried at 30 to 40° C. contain 0.1% of active substance referred to their own weight.

To test the effect on bacteria round discs of 10 mm. diameter of the impregnated fabrics (without washing and after an EMPA-wash respectively) are placed upon brain heart infusion agar plates previously inoculated with *Staphylococcus aureus*, and the plates are then incubated for 24 hours at 37° C.

The evacuation extends, on the one hand, to the inhibitory zone (IZ in mm.) appearing round the discs and, on the other hand, to the growth that can be detected microscopically underneath the discs (G percent):

Unwashed:
  IZ, mm. _____ 0
  G percent _____ 0
After EMPA-wash:
  IZ, mm. _____ 0
  G percent _____ 0

Example 3

For the manufacture of an antimicrobial soap in cake form 1.2 g. of the compound of Formula 3 or 4 are added to the following mixture:

120 g. of basic soap in flake form
0.12 g. of the disodium salt of ethylenediaminetetraacetic acid (dihydrate)
0.24 g. of titanium dioxide.

The soap chips obtained by rolling are powdered in a high-speed stirrer and then pressed to form soap in cake form.

A solution each of 5% and 1.5% strength of this soap in sterile tap water is prepared. 1 ml. each of these solutions is added to 4 ml. of sterile brain heart infusion broth. By continually diluting each solution to its 10 fold two series are obtained which on combination furnish the following continuous dilution series: 100, 30, 10, 3, 1 parts per million of active substance.

The solutions are inoculated with cultures of *Staphlococcus aureus* and incubated for 24 hours at 37° C. After this time 0.05 ml. is taken out of each solution with a pipette and run over brain heart infusion slant-agar. The agar tubes are incubated for another 24 hours at 37° C. and then the minimal lethal concentration is determined:

| Compound of the formula: | Effect against *Staphylococcus aureus* |
|---|---|
| (3) | 10 |
| (4) | 10 |

Example 4

Sterile round discs of cotton (3.0 g.) of 4 cm. diameter are inoculated with 0.1 cc. each of a suspension of *Staphylococcus aureus* containing 50% of sterile bovine serum and 10⁴ germs and dried for 1 hour at 37° C. The discs are then washed for 15 minutes at 45° C. in a laboratory washing machine at a goods-to-liquor ratio of 1:20 with 4 g. per litre of a detergent based on dodecylbenzenesulphonate contraining 1% of the compound (3) or (4). The discs are then rinsed at the same goods-to-liquor ratio for 15 minutes at 45° C. and then 3×5 minutes at 20° C. The round fabric discs are then initially dried between sterile filter paper. The curative effect washing temperature 45° C.) is then determined in the following manner:

The round discs treated with the compound of the Formula 3 or 4 are placed on an agar plate (brain heart infusion agar+0.1% of yeast per litre of agar) each and incubated at 37° C. After 1 hour the discs are removed. Result: None of the discs displays a colony of *Staphlococcus aureus*.

We claim:

1. A preparation for combating fungi and bacteria which comprises an effective amount of a diphenylketone of the formula

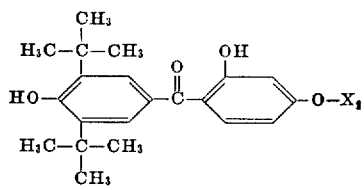

in which $X_2$ represents a member selected from the group consisting of hydrogen, Cl—$CH_2$—CO and alkyl—CO— whose alkyl groups contains 1 to 3 carbon atoms and a carrier therefor.

2. A preparation according to claim 1 in which the diphenylketone is the formula

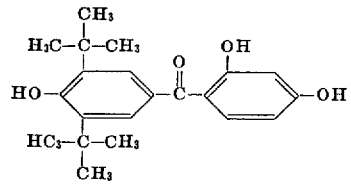

3. A preparation according to claim 1 in which the diphenylketone is of the formula

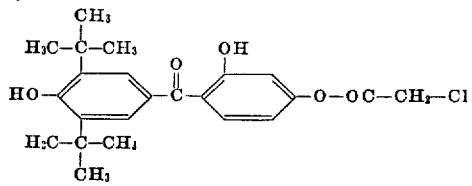

4. A preparation for combating fungi and bacteria which comprises an effective amount of a diphenylketone of the formula

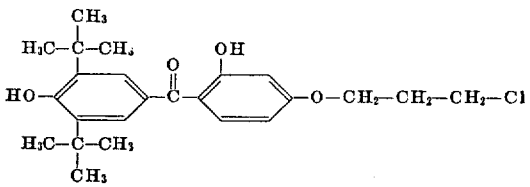

and a carrier therefor.

5. A preparation for combating fungi and bacteria which comprises an effective amount of a diphenylketone of the formula

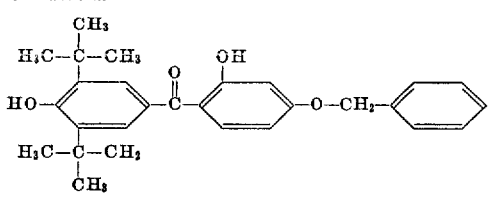

and a carrier therefor.

6. A preparation for combating fungi and bacteria which comprises an effective amount of a diphenylketone of the formula
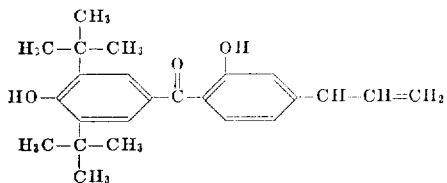
and a carrier therefor.
References Cited
UNITED STATES PATENTS
| 2,419,553 | 4/1947 | Houtman, Jr. | 260—591 |
| 2,565,300 | 8/1951 | Faith et al. | 260—591 |
| 2,971,030 | 2/1961 | Hudson | 260—591 |
| 3,086,988 | 4/1963 | Gordon | 260—488 |
| 3,215,530 | 11/1965 | Riebel | 96—48 |
| 3,403,967 | 10/1968 | Stanley | 81—76 |
FOREIGN PATENTS
| 599,206 | 5/1960 | Canada | 260—591 |
| 612,180 | 1/1961 | Canada | 260—591 |
ALBERT T. MEYERS, Primary Examiner
F. E. WADDELL, Assistant Examiner
U.S. Cl. X.R.
260—591; 424—331

PO-1050
(5/69)

UNITED STATES PATENT OFFICE
CERTIFICATE OF CORRECTION

6195/E

Patent No. 3,592,931               Dated  July 13, 1971

Inventor(s)  Max Duennenberger et al

It is certified that error appears in the above-identified patent and that said Letters Patent are hereby corrected as shown below:

Column 6, claim 5, the left-hand side of the structural formula should read ---

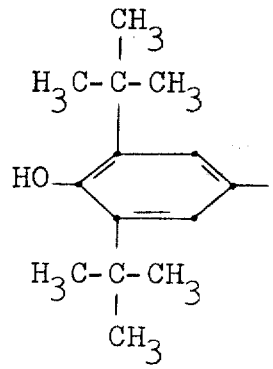

---.

Signed and sealed this 18th day of January 1972.

(SEAL)
Attest:

EDWARD M. FLETCHER, JR.          ROBERT GOTTSCHALK
Attesting Officer                Acting Commissioner of Patents